United States Patent Office 2,874,178
Patented Feb. 17, 1959

2,874,178

O-(CHLOROPHENYL) O-LOWER ALKYL PHOSPHORO(ISOTHIOCYANATIDO)THIOATES

Edgar C. Britton and Etcyl H. Blair, Midland, Mich., assignors to The Dow Chemical Company, Midland, Mich., a corporation of Delaware No Drawing. Application November 1, 1956
Serial No. 619,697

3 Claims. (Cl. 260—454)

This invention is concerned with the O-(chlorophenyl) O-lower alkyl phosphoro(isothiocyanatido) thioates having the formula

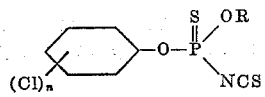

wherein R represents methyl or ethyl and n is an integer from 1 to 3, inclusive. These compounds are viscous liquids somewhat soluble in many organic solvents and of very low solubility in water. They have been found to be active as parasiticides and are adapted to be employed as active toxic constituents of compositions for the control of many insect organisms and nematodes.

The new compounds may be prepared by reacting an alkali metal isothiocyanate with an O-(chlorophenyl) O-lower alkyl phosphorochloridothioate of the formula

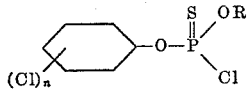

The reaction is carried out in the presence of an inert organic solvent such as acetonitrile, acetone or tetrahydrofuran. The reaction is somewhat exothermic and takes place smoothly at temperatures of from 10° to 50° C. with the formation of the desired product and alkali metal chloride of reaction. The temperature may be controlled by regulating the rate of contacting the reactants and by external cooling. Good results are obtained when employing substantially equimolecular proportions of the reactants.

In carrying out the reaction, the phosphorochloridothioate is added portionwise to the alkali metal isothiocyanate dissolved in the reaction solvent. If desired, the order of addition of the reactants may be reversed. In either case, the addition is carried out with stirring and at a temperature of from 10° to 50° C. Upon completion of the reaction, the alkali metal chloride is removed by filtration and the solvent thereafter removed by evaporation or distillation to obtain the desired product as a liquid residue.

The following examples illustrate the invention but are not to be construed as limiting:

Example 1.—O-(2,4,5-trichlorophenyl) O-methyl phosphoro(isothiocyanatido) thioate

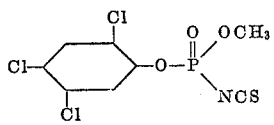

32.6 grams (0.1 mole) of O-(2,4,5-trichlorophenyl) O-methyl phosphorochloridothioate was added portionwise with stirring to a solution of 10 grams (0.1 mole) of potassium isothiocyanate in 100 milliliters of acetonitrile. The addition was carried out in 20 minutes and at a temperature of from 25° to 32° C. Stirring was thereafter continued for 30 minutes and the reaction mixture set aside overnight. The solid potassium chloride which precipitated was removed by filtration and the solvent removed from the filtrate by distillation. As a result of these operations, there was obtained an O-2,4,5 - trichlorophenyl) O - methyl phosphoro(isothiocyanatido) thioate product as a viscous liquid residue which was found to contain 31.64 percent chlorine compared to the theoretical value of 30.60 percent.

Example 2.—O-(2,4 - dichlorophenyl) O-ethyl phosphoro(isothiocyanatido) thioate

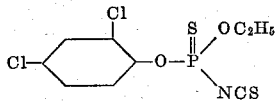

This compound is prepared in the same manner as that described in Example 1 by the reaction of equimolecular proportions of O-(2,4-dichlorophenyl) O-ethyl phosphorochloridothioate and sodium isothiocyanate using methylene chloride as a solvent. As a result of these operations, there is obtained an O-(2,4-dichlorophenyl) O-ethyl phosphoro(isothiocyanatido) thioate product as a viscous liquid having a molecular weight of 314.

Example 3.—O-(4-chlorophenyl) O-methyl phosphoro-(isothiocyanatido) thioate

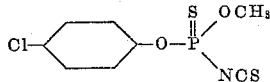

A solution of 25.7 grams (0.1 mole) of O-(4-chlorophenyl) O-methyl phosphorochloridothioate in 50 milliliters of acetonitrile was added portionwise with stirring to a solution of 10 grams (0.1 mole) of potassium isothiocyanate in 100 milliliters of acetonitrile. The addition was carried out in 30 minutes and at a temperature of from 26° to 29° C. Stirring was thereafter continued for 2.5 hours and the reaction mixture allowed to stand overnight. The mixture was then processed as described in Example 1 to separate an O-(4-chlorophenyl) O-methyl phosphoro(isothiocyanatido) thioate product as a yellow, viscous liquid having a refractive index n/D of 1.6032 at 25° C.

In a similar manner other O-(chlorophenyl) O-lower alkyl phosphoro(isothiocyanatido) thioates may be prepared as follows:

O-(2-chlorophenyl) O-ethyl phosphoro(isothiocyanatido) thioate by the reaction of potassium isothiocyanate and O-(2-chlorophenyl) O-ethyl phosphorochloridothioate.

O-(3,4-dichlorophenyl) O-methyl phosphoro(isothiocyanatido) thioate by the reaction of sodium isothiocyanate and O-(3,4-dichlorophenyl) O-methyl phosphorochloridothioate.

O-(2,4,5-trichlorophenyl) O-ethyl phosphoro(isothiocyanatido) thioate by the reaction of sodium isothiocyanate and O - (2,4,5-trichlorophenyl) O-ethyl phosphorochloridothioate.

O-(4-chlorophenyl) O-ethyl phosphoro(isothiocyanatido) thioate by the reaction of potassium isothiocyanate and O-(4-chlorophenyl) O-ethyl phosphorochloridothioate.

O-(2,4-dichlorophenyl) O-methyl phosphoro(isothiocyanatido) thioate by the reaction of sodium isothiocyanate and O-(2,4-dichlorophenyl) O-methyl phosphorochloridothioate.

The new compounds of the present invention are effective as parasiticides and are adapted to be employed for the control of many household and agricultural pests and particularly nematodes. For such use the products may be dispersed on a finely divided carrier and employed as dusts. The new products may also be employed in oils, as constituents in water emulsions or in water dispersions. In a representative operation, 100 percent control of rootknot nematodes have been obtained with aqueous compositions containing 10 parts by weight of O-(2,4,5-trichlorophenyl) O-methyl phosphoro(isothiocyanatido) thioate per million parts of ultimate mixture.

The O-chlorophenyl O-lower alkyl phosphorochloridothioates employed as starting materials in the present method may be prepared by reacting from 2 to 3 molecular proportions of methanol or ethanol with one molecular proportion of an O-chlorophenyl phosphorodichloridothioate at a temperature at which hydrogen chloride is formed as a product of reaction while continuously withdrawing hydrogen chloride in the gaseous state from the reaction mixture as formed, said temperature being at least 15 centigrade degrees below the boiling point at 760 millimeters' pressure of the alkanol. In carrying out the reaction, the methanol or ethanol may be added portionwise to the O-chlorophenyl phosphorodichloridothioate reagent at a temperature of 40° to 50° C. and under conditions of reduced pressure in the reaction mixture. Following the reaction, the reaction mixture is partially distilled under reduced pressure to remove low boiling constituents and obtain the desired product as a crystalline or liquid residue.

We claim:
1. An O-(chlorophenyl) O-lower alkyl phosphoro(isothiocyanatido) thioate having the formula

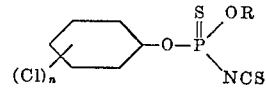

wherein R is selected from the group consisting of methyl and ethyl and $n$ is an integer from 1 to 3, inclusive.

2. O-(4-chlorophenyl) O-methyl phosphoro(isothiocyanatido) thioate.

3. O-(2,4,5-trichlorophenyl) O-methyl phosphoro(isothiocyanatido) thioate.

References Cited in the file of this patent
UNITED STATES PATENTS

| | | |
|---|---|---|
| 2,552,541 | Drake et al. | May 15, 1951 |
| 2,620,292 | Emerson et al. | Dec. 2, 1952 |

OTHER REFERENCES

Farbenfabriken Bayer Aktiengesellschaft, German application Serial No. F16670, printed May 17, 1956 (KL 120, 22).